(No Model.) 5 Sheets—Sheet 1.

W. A. SMITH & I. A. WESTON.
MACHINE FOR POINTING COTTERS.

No. 319,429. Patented June 2, 1885.

Witnesses.
W. C. Raymond.
E. C. Cannon

Inventors.
Willard A. Smith
Irving A. Weston

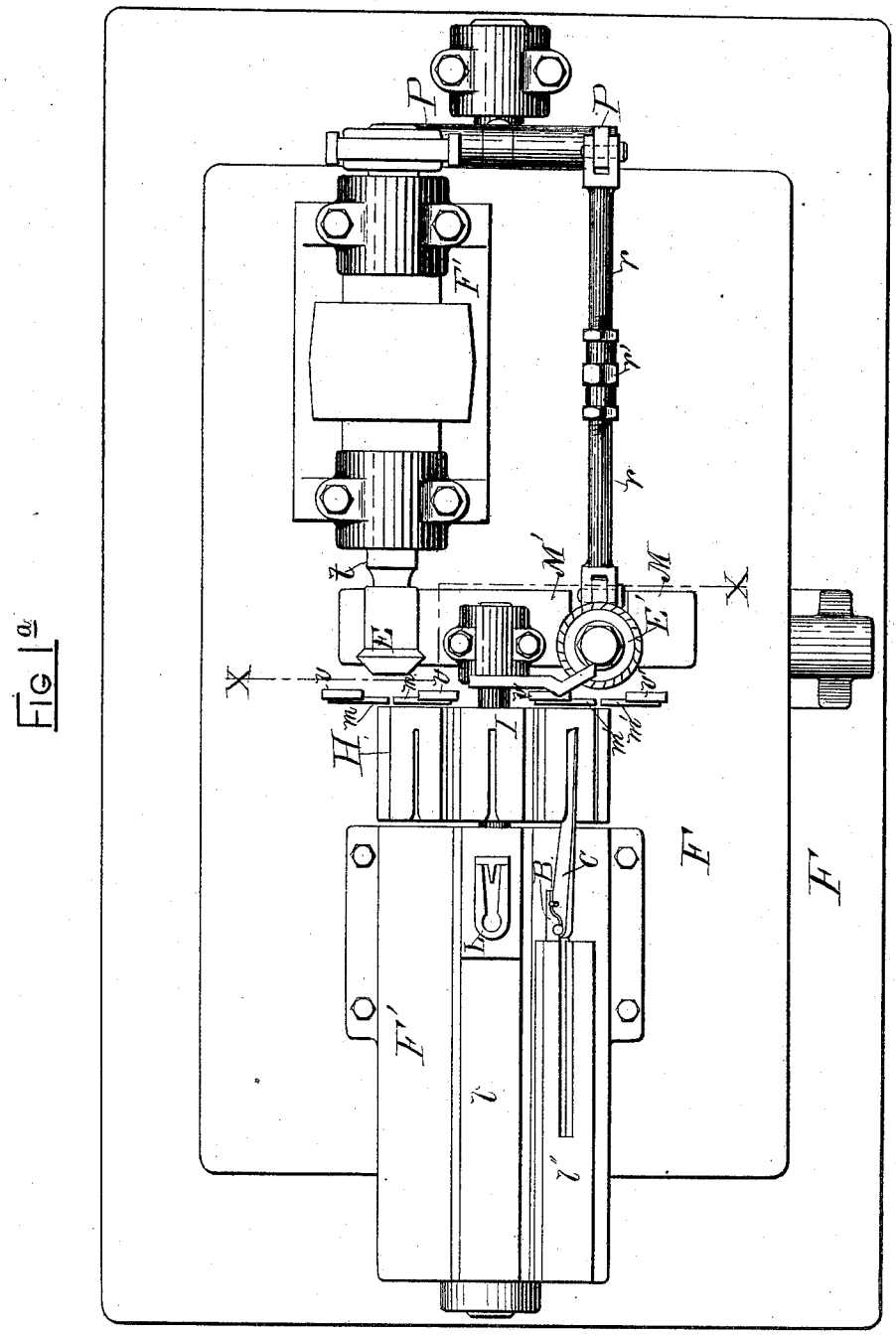

(No Model.) 5 Sheets—Sheet 3.
W. A. SMITH & I. A. WESTON.
MACHINE FOR POINTING COTTERS.
No. 319,429. Patented June 2, 1885.
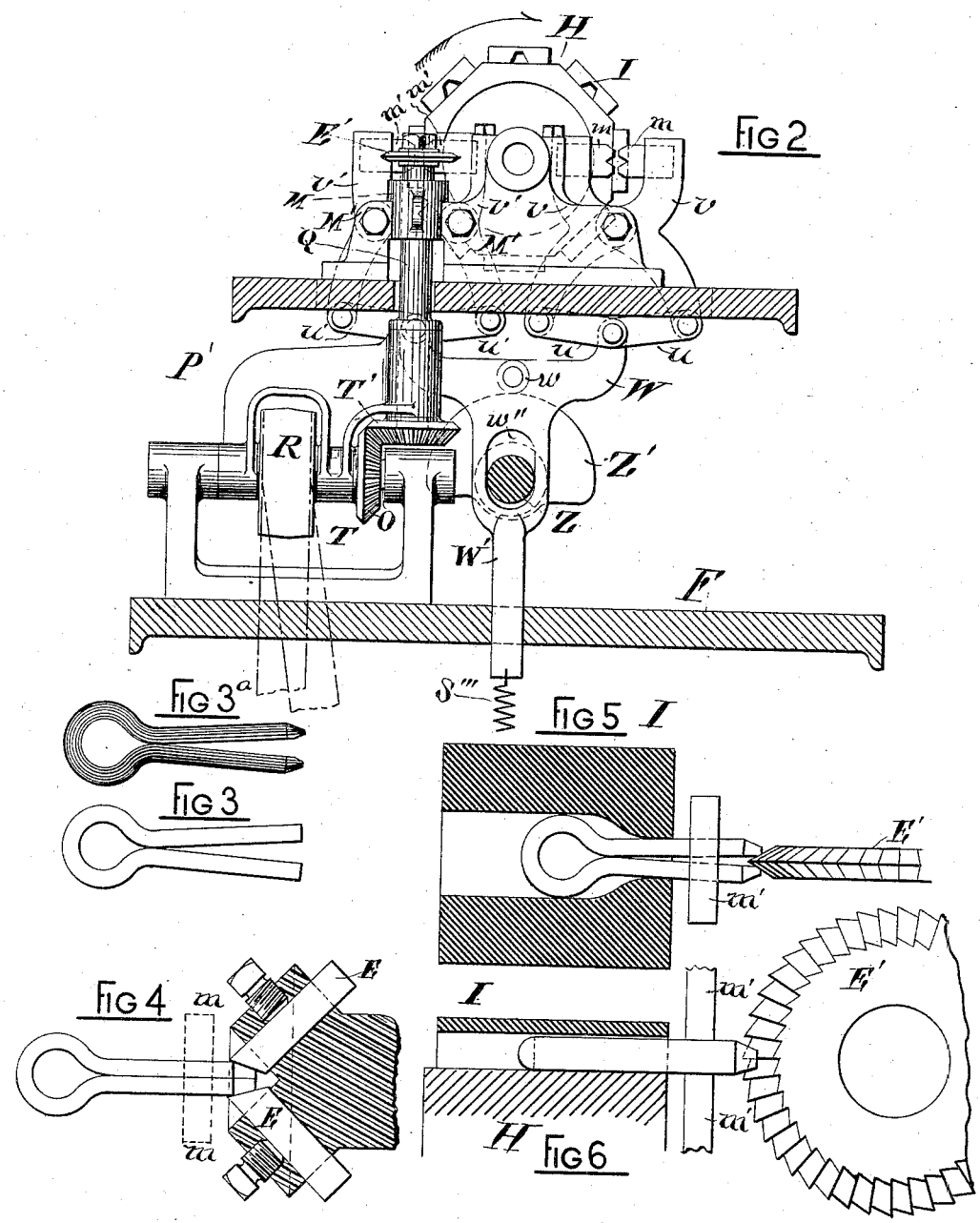
Witnesses.
W. E. Raymond
E. C. Cannon
Inventors.
Willard A. Smith
Irving A. Weston (No Model.) 5 Sheets—Sheet 4.
W. A. SMITH & I. A. WESTON.
MACHINE FOR POINTING COTTERS.

No. 319,429. Patented June 2, 1885.

Witnesses
A. C. Raymond.
E. C. Cannon

Inventors
Willard A. Smith.
Irving A. Weston.

(No Model.)   5 Sheets—Sheet 5.

W. A. SMITH & I. A. WESTON
MACHINE FOR POINTING COTTERS.

No. 319,429. Patented June 2, 1885.

Witnesses.
W. C. Raymond
E. C. Cannon

Inventors.
Willard A. Smith
Irving A. Weston

N. PETERS, Photo-Lithographer, Washington, D. C.

UNITED STATES PATENT OFFICE.

WILLARD A. SMITH AND IRVING A. WESTON, OF SYRACUSE, NEW YORK, ASSIGNORS TO THE WHITMAN & BARNES MANUFACTURING COMPANY, OF SAME PLACE.

MACHINE FOR POINTING COTTERS.

SPECIFICATION forming part of Letters Patent No. 319,429, dated June 2, 1885.

Application filed March 18, 1885. (No model.)

*To all whom it may concern:*

Be it known that we, WILLARD A. SMITH and IRVING A. WESTON, of Syracuse, in the county of Onondaga, in the State of New York, have invented new and useful Improvements in Cotter-Pointing Machines; of which the following, taken in connection with the accompanying drawings, is a full, clear, and exact description.

This invention consists in a novel organization of mechanisms designed for pointing expeditiously and at a minimum expenditure of manual labor the ends of cotters or split keys, all as hereinafter more fully described, and specifically set forth in the claims.

Figure 1:
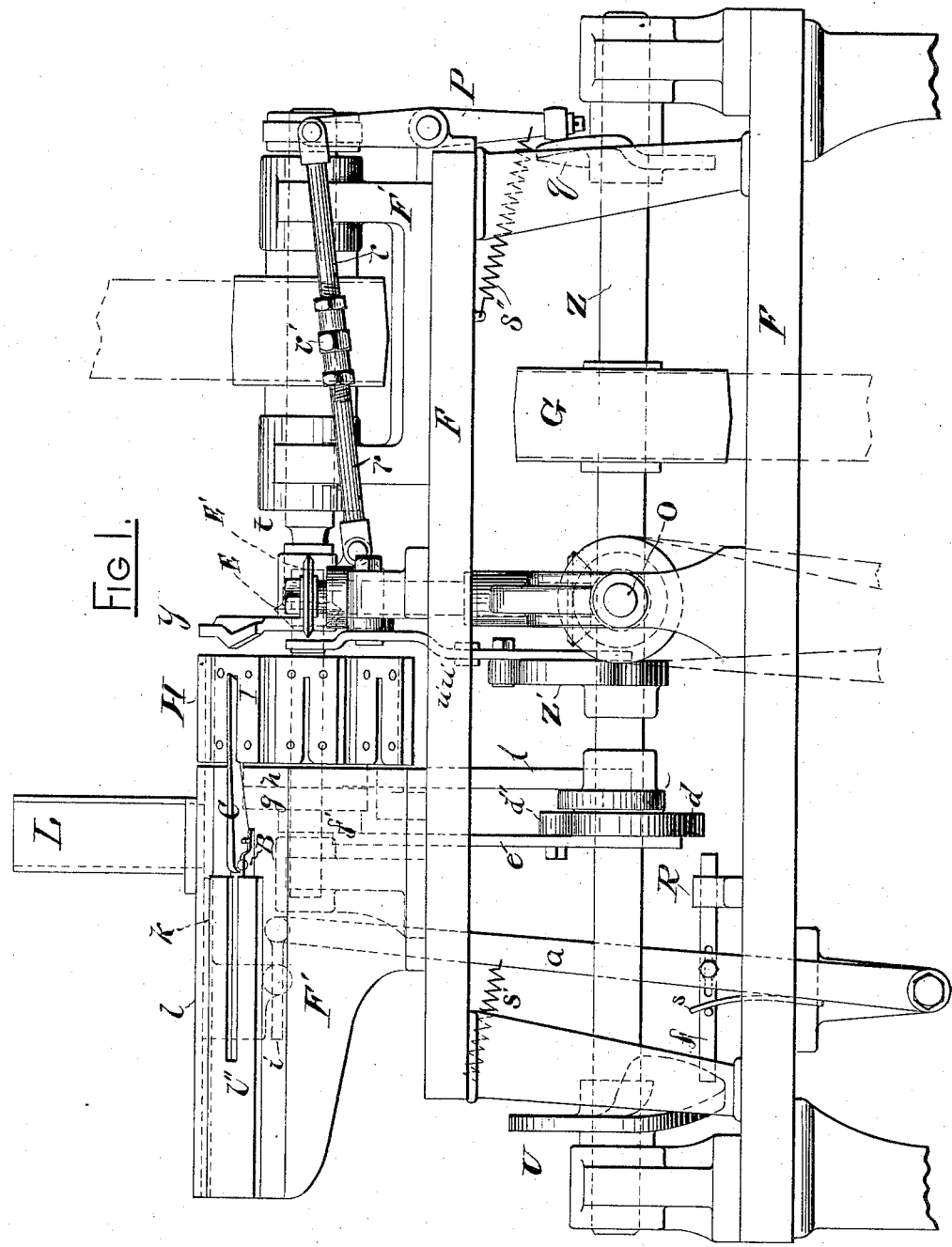
Figure 7:
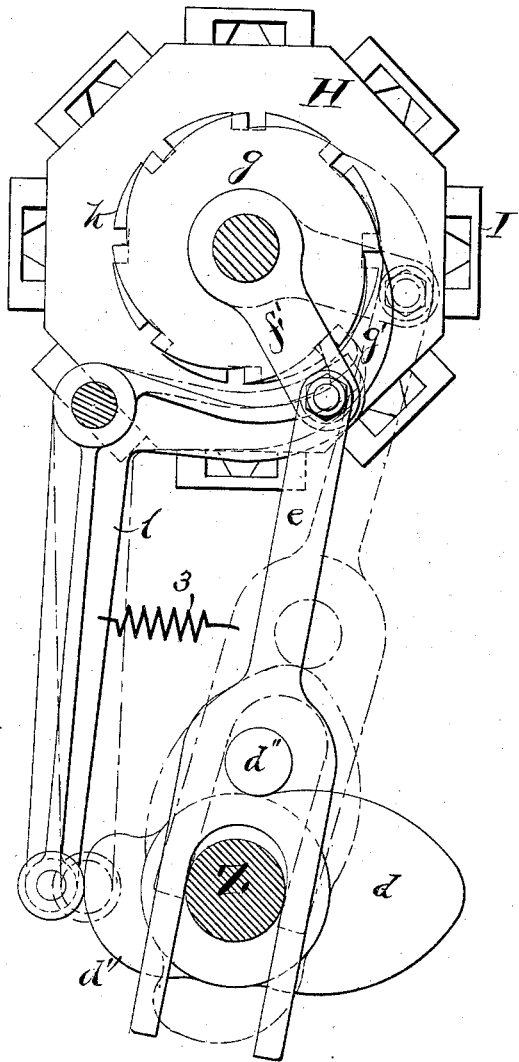
Figure 8:
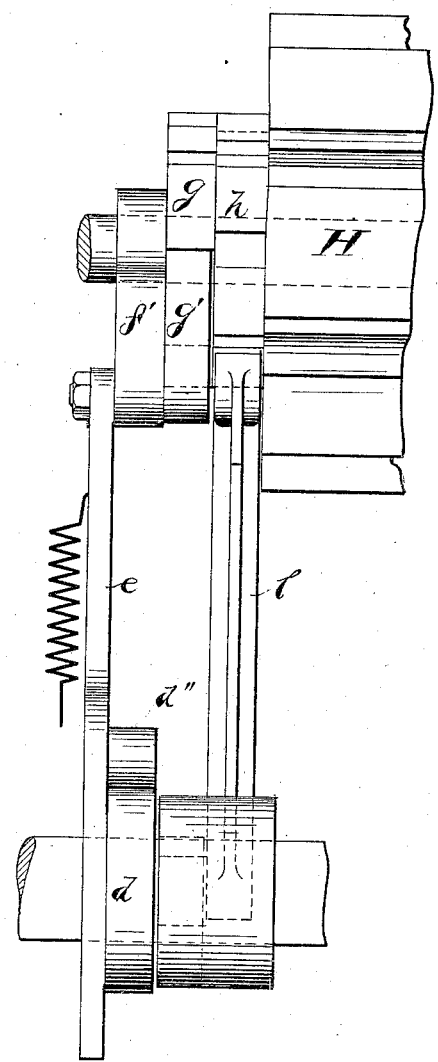
Figure 9:
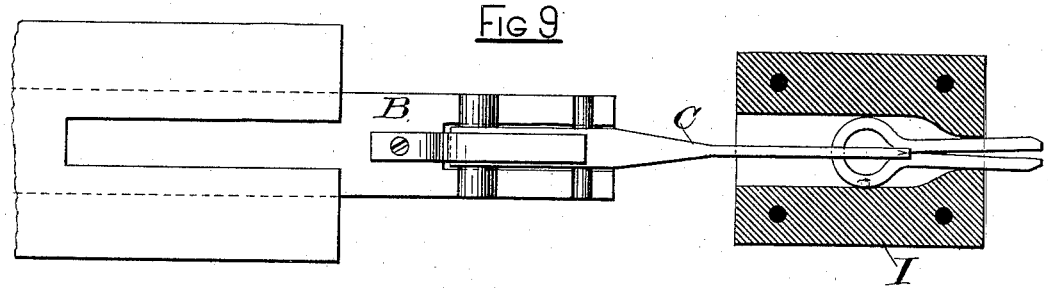
Figure 10:
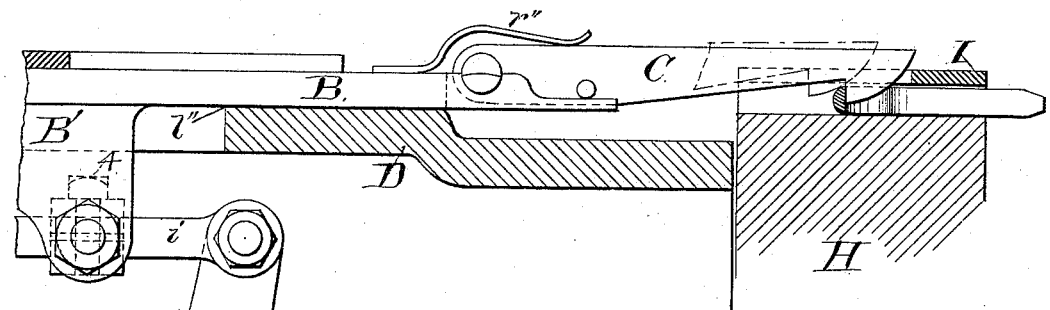
Figure 11:
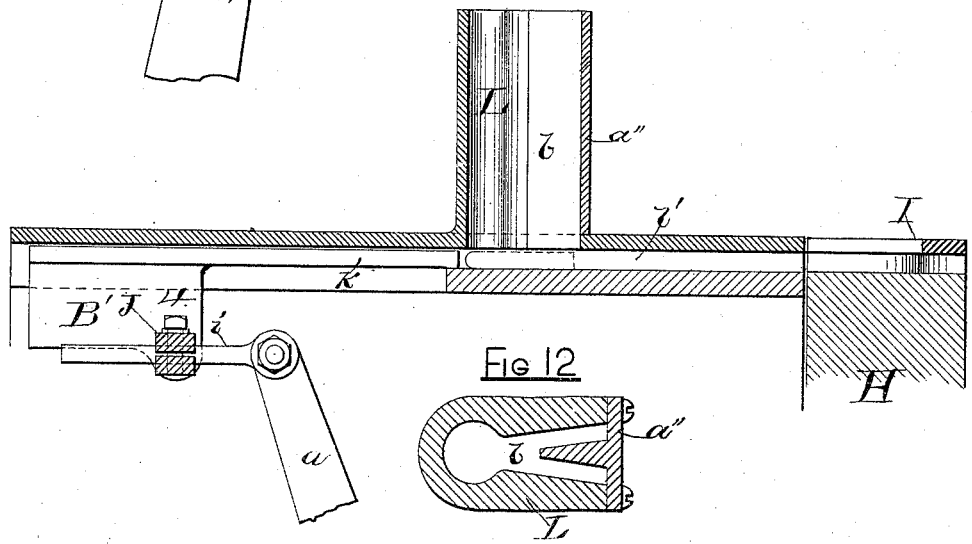
Figure 12:
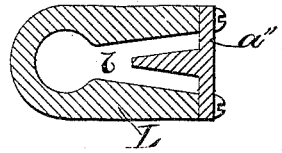

In the annexed drawings, Figure 1 is a side elevation of our invention. Fig. 1$^a$ is a top plan view of the same. Fig. 2 is a vertical transverse section on line $x$ $x$, Fig. 1, with one set of cutters and their shaft removed to show the cotter-sustaining jaws. Figs. 3 and 3$^a$ are plan views of the cotter, showing its conditions, respectively, before and after it has been subjected to the operation of the pointing-machine. Fig. 4 is an enlarged sectional view of the cutter-head carrying the cutters which taper the ends of the cotter on their exterior. Figs. 5 and 6 are sectional views, taken in planes at right angles to each other, of the cotter-carrier holding the cotter in position for beveling the ends thereof on their interior. Figs. 7 and 8 are enlarged end and side views, respectively, of the mechanisms employed for imparting intermittent rotary motion to the head or cylinder which carries the cotter-carrier. Figs. 9 and 10 are enlarged detail views, taken in planes at right angles to each other, of the means for retracting the finished cotter from its carrier. Fig. 11 is a vertical transverse section of the feed-hopper and the means for conveying the cotter to the carrier which holds the same in position to be operated on by the pointing-tools, and Fig. 12 is a transverse section of said feed-hopper.

Similar letters of reference indicate corresponding parts.

F represents a stout iron frame, which supports the mechanisms of the machine, said frame being horizontally elongated, and in suitable bearings on the lower portion thereof is journaled the cam shaft Z, which is extended lengthwise of said frame, and has secured to it the driving-pulley G. One end of the frame F is provided at its top with an upward extension, F', and on the end thereof, facing the opposite end of the frame F, is pivoted a cylindrical or prismatical head, H, which is rotated intermittently and at regular intervals by the following instrumentalities, to wit:

To the axis of the head H, at the rear of the latter, are rigidly attached a circular-rack, $h$, a ratchet-wheel, $g$, and a crank, $f'$, as best seen in Figs. 7 and 8 of the drawings, and on the cam-shaft Z are secured two cams, $d$ $d'$. A pitman, $e$, is connected at its upper end to the crank $f'$, and has its lower end slotted or bifurcated and astride the cam-shaft Z, so as to be guided thereby. A roller, $d''$, is pivoted on the pitman in such a position as to come in contact with the cam $d$, and is held in such contact either by the gravity of the pitman or by a spring connected therewith. The cam is formed of such a sweep that when rotated by the shaft Z said cam imparts only an oscillatory movement to the crank $f$, and this movement of the crank imparts an intermittent rotary motion to the head H by means of a pawl, $g'$, which is connected with the crank and alternately engages and releases the ratchet-wheel $g$ during the forward and backward movement of the oscillating crank $f'$.

In order to insure positive stops in the intervals of the movement of the head H, a bell-crank lever, $l$, is pivoted on a suitable journal secured to the upward extension F' of the frame F, the upper arm of which lever is adapted to engage the rack $h$, hereinbefore referred to.

The lower end of the lever $l$ is held in contact with the cam $d'$ by a spring, 3, and thus said lever receives an oscillating motion during the rotation of the shaft Z. The cam $d'$ is of such a contour and stands at such an angle in relation to the other cam, $d$, as to cause the upper arm of the lever $l$ to enter one of the notches in the rack $h$ and remain therein while the pawl $g'$ is drawn back into position to engage with another of the ratchet-teeth on wheel $g$.

On the sides of the head H, and equidistantly apart, are mounted a series of cotter-carriers, I I, in the form of boxes, having their cavity arranged parallel with the axes of the head H, and extending through both ends, the rear and main portion of said cavity being of a width to admit the head of the cotter, while the opposite end of the cavity is contracted, and only permits the ends of the cotter to protrude from the carrier, as shown in Fig. 5 of the drawings. Back of the head H is a guide-channel, $l'$, arranged to communicate at one end with the rear ends of the cavities of the cotter-carriers I I, as they are brought successively in front of said channel by the intermittent rotation of the head H. From the channel $l'$ rises a hopper or chute, L, which has its channel formed with a flare at one side for the reception of the normally-flaring shanks of the cotters, and to said side of the chute is attached a plate, $a''$, provided with a vertical rib, $b$, which is tapered in cross-section, as shown in Fig. 12 of the drawings. Said rib prevents the cotters from turning while passing through the chute, and thus guides the cotters in a horizontal position to the channel $l'$. The chute L is situated between the head H and the end of an intermittent reciprocating push-bar, $k$, which slides in the guide-channel $l'$, and receives its motion from a lever, $a$, pivoted on the lower portion of the frame F, and connected at its upper end with the push-bar $k$ by an arm, $i$, pivoted on the said lever and extending transversely through a longitudinal slot in a rock-shaft, J, which is journaled in hangers B' on the push-bar $k$, and on a slide, B, hereinafter described. The slot of the rock-shaft allows the same to spring apart sufficiently to allow the arm $i$ to be pushed a greater or less distance through the slot of said shaft. By means of a bolt, 4, passing through the rock-shaft at right angles to the slot thereof the slotted portion of the shaft can be drawn together, so as to clamp the arm $i$ in its requisite position. By the aforesaid adjustment of the length of the arm $i$ between its points of connection with the rock-shaft J and lever $a$, the thrust of the push-bar $k$ can be regulated to carry cotters of different lengths into the requisite position in the cotter-carrier. The lever $a$ has connected to it a push-bar, $f$, which slides rectilinearly in a suitable guide, R', and has one end bearing against a cam, U, attached to the shaft Z, as shown in Fig. 1 of the drawings. The rotation of said cam in conjunction with the spring S' imparts an intermittent reciprocating motion to the push-bar $f$, and the latter transmits oscillatory motion to the lever $a$, which in turn imparts intermittent reciprocating motion to the push-bar $k$, which pushes the cotter into the cotter-carrier I.

Parallel with the before-described channel $l'$ is another guide-channel, $l''$, the distance between said channels being equal to the distance between the centers of the two cotter-carriers I I.

In the channel $l''$ is an intermittent reciprocating slide, B, and on the end thereof facing the head H is pivoted or hinged a hooked arm, C, as shown in Figs. 9 and 10 of the drawings. A spring, $r''$, attached to the slide B and pressing on the top of the arm C, serves to hold the hooked end thereof down in the channel $l''$. The slide B is moved synchronously with the push-bar $k$, hereinbefore described, by the intermittent oscillatory lever $a$, connected with the rock-shaft J, one end of which is journaled in the hanger B', attached to the slide B, as shown in Fig. 10 of the drawings on an enlarged scale.

Since the slide B with its hooked arm C and a push-bar, $k$, have in common one set of actuating mechanism, it is obvious that the adjustment of the connection of the arm $i$ with the rock-shaft J regulates the thrust of the said hooked arm simultaneously with and to the same degree as that of the push-bar.

At diametrically-opposite sides of the head H, and near the ends of the cotter-carriers I I, are arranged jaws $m\ m$ and $m'\ m'$, which are attached to the upper ends of pivoted levers $v\ v$ and $v'\ v'$, as shown in Fig. 2 of the drawings. To the lower ends of said levers are connected toggles $u\ u$ and $u'\ u'$, which in turn are connected with a yoke, W, having a vertical guide-slot, $w''$, by which it strides the shaft Z. A cam, Z', is attached to said shaft, and a roller, $w'$, is pivoted on the side of the yoke W and rides on the aforesaid cam. The latter is of such a contour as to impart an intermittent reciprocating movement to the yoke by the medium of the aforesaid roller held in contact with the rotating cam Z', either by gravity of the yoke or by a suitable spring, S''', drawing it down. The yoke is guided rectilinearly by the slot $w''$, through which the shaft Z passes, and by a vertical stem, W', extending from the foot of the yoke through an aperture in the frame F. The reciprocating movement of the yoke W causes the levers $v\ v$ and $v'\ v'$ to open and close the jaws $m\ m$ and $m'\ m'$ at regular intervals corresponding to the intervals of the movement of the head H.

Facing the jaws $m\ m$ are arranged cutters E E, secured to the end of a rotary shaft, $t$, and having their cutting-edges at such angles as to produce a taper or bevel on the end of the cotter introduced between them, as hereinafter described, and as shown in Fig. 4 of the drawings. The shaft $t$ is rotated by a belt and pulley, as illustrated in Fig. 1 of the drawings, and receives an intermittent reciprocating movement by a lever, P, pivoted on the frame F, and having its upper end connected with a collar mounted on the shaft $t$ in such a manner as to allow said shaft to freely rotate in the collar and at the same time prevent the collar from moving endwise on the shaft. The lower end of the lever is held by a spring, S'', against a cam, $q$, attached to the shaft Z, which imparts intermittent oscillatory movement to the lever P, and the latter produces the intermittent reciprocating motion of the shaft $t$. The head H moves in the direction indicated by arrows, Fig. 2 of the drawings, and carries the cotters contained in the carriers I I first to the jaws $m$ $m$, and so soon as they arrive thereat the head H stops, while the jaws $m$ $m$ close against the flaring shanks of the cotter and compress the same, as illustrated in Fig. 4 of the drawings. Immediately after this is effected the rotary shaft $t$ is moved forward, to bring the cutters E E into position for trimming and pointing the ends of the cotter-shanks. By the time this is accomplished the shaft $t$ retracts, the jaws $m$ $m$ open and release the cotter, the head rotates another step and brings another cotter into position to be operated on by the cutters E E. When the cotters arrive at the jaws $m'$ $m'$, the latter close against the sides of the cotter-shanks protruding in a slightly-distended condition from the end of the cotter-carrier I, as shown in Fig. 5 of the drawings.

Facing the end of the cotter is a horizontal circular cutting or milling wheel, E', having a V-shaped peripheral cutting-edge arranged to enter between the ends of the cotter-shanks, the jaws $m'$ $m'$ serving to sustain the cotter during the operation of the milling-wheel. This milling-wheel is mounted on an upright shaft, Q, the lower end of which is journaled on a pedestal, P', which is loosely mounted on a horizontal rotary shaft, O, and adapted to oscillate thereon. A miter-gear, T, on the shaft O meshes in a miter-gear, T', on the lower end of the upright shaft Q, and thus transmits rotary motion to the latter shaft. The upper end of the upright shaft Q is sustained and guided by a box, M, embracing the shaft and riding on horizontal guides M'. Said box receives an intermittent reciprocating motion by a rod, $r$, connected at one end with the box M' and at the opposite end with the lever P, which also reciprocates the shaft $t$, hereinbefore described. The intermittent reciprocating movement of the rod $r$ carries the milling-wheel at proper intervals between the ends of the cotter-shanks, and retracts the milling-wheel in time to allow the head H to proceed after the milling-wheel has performed its operation on the cotter.

The effect of the described milling-wheel is a bevel on the inner sides of the ends of the cotter-shanks, as illustrated in Fig. 3ª of the drawings.

In order to adjust the position of shaft O so as to conform to different sizes of milling-wheels E', we form the rod $r$ of two parts spliced together by a right and left screw-threaded sleeve, $r'$, screwed onto correspondingly screw-threaded end portions of the two rod-sections, as represented in Fig. 1 of the drawings, said described splice allowing the rod $r$ to be shortened or lengthened as may be necessary to conform to the different sizes of milling-wheels E'.

After the cotters have been operated on, as before described, the head H carries the cotter-carriers I I around and in range with the hooked arm C, the movement of which is so timed that while the head is momentarily stationary in the aforesaid position said hooked arm is thrust into the cotter-carrier I and caused to engage the eye of the cotter, and is then immediately retracted to withdraw the cotter from the carrier I.

To compensate for variations in the lengths of cotters, and to also prevent violent jars at the ends of the movements of the hooked arm C and push-bar $k$, we provide the bar $f$ with a longitudinal slot for the reception of the pin or bolt by which it is connected with the lever $a$, as shown by dotted lines in Fig. 1 of the drawings, and to the said lever we attach a spring, S, the free end of which bears against a pin or lug on the bar $f$.

Having described our invention, what we claim, and desire to secure by Letters Patent, is—

1. A cotter-pointing machine comprising a cotter-carrier provided with an opening through which the shanks of the cotter protrude, and a cutting or abrading tool facing the said opening of the cotter-carrier, as set forth, 2. In a cotter-pointing machine, the combination of a cotter-carrier provided with openings through which the shanks of the cotters protrude, jaws for pressing the protruding shanks of the cotter together, and a rotary cutting or abrading tool facing the ends of said shanks and beveled according to the bevel to be given to the cotter-shanks, as set forth and shown.

3. In combination with the cotter-carrier provided with openings through which the shanks of the cotters protrude and a cutting or abrading tool facing said opening, a push-bar for moving the cotter into its position in the carrier.

4. In combination with the cotter-carrier provided with openings through which the shanks of the cotter protrude and a cutting or abrading tool facing said opening, a push-bar for moving the cotter into its position in the carrier and a chute for delivering the cotter to the push-bar.

5. In combination with the cotter-carrier provided with openings through which the shanks of the cotters protrude and a cutting or abrading tool facing said opening, a channel communicating with the opposite end of the cotter-carrier, a push-bar moving in said channel, and a chute for delivering the cotters in the aforesaid channel between the push-bar and cotter-carrier.

6. The cotter-chute L, provided with the central guide, $b$, substantially as and for the purpose set forth.

7. The cotter-chute L, having its channel formed with a flare at one side for the reception of the shanks of the cotter, and having the plate $a''$, attached to said chute and provided with the rib $b$, projecting into the flaring portion of the channel, substantially as described and shown, for the purpose set forth.

8. The combination of the intermittent rotary head H, cotter-carriers I I, mounted on said head, and combined rotary and intermittent reciprocating cutters facing the cotter-carrier, substantially as set forth.

9. The combination of the intermittent rotary head H, cotter-carriers I I, mounted on said head, jaws $m$ $m$, for pressing together the ends of the cotter-shanks, and combined rotary and intermittent reciprocating cutters arranged in front of the said jaws to bevel the ends of the cotter-shanks, substantially as specified and shown.

10. In combination with the intermittent rotary head H and cotter-carriers I I, mounted thereon, the rotary shaft $t$, arranged movable endwise on its bearings, cutters E E, attached to said shaft, the pivoted lever P, connected at one end with the shaft $t$, the rotary cam $q$, engaging the opposite end of said lever, and the spring S″, holding the lever in contact with said carrier, substantially as described and shown.

11. In combination with the cotter-carrier, a beveled milling-tool arranged to enter between the ends of the cotter-shanks, to bevel said ends on their adjacent sides, substantially as set forth and shown.

12. The combination of the cotter-carrier provided with an opening for the protrusion of the cotter-shanks, and a milling-wheel having on its periphery a V-shaped cutting-edge arranged to enter between the ends of the cotter-shanks, substantially as and for the purpose specified.

13. The combination of the cotter-carrier provided with an opening for the protrusion of the cotter-shanks, a milling-wheel having a peripheral V-shaped cutting-edge arranged to enter between the ends of the cotter-shanks, and jaws arranged to bear against opposite sides of the cotter between the carrier and milling-tool, substantially as and for the purpose set forth.

14. The combination of the intermittent rotary head H, cotter-carriers I I, mounted on said head, the combined oscillatory and rotary shaft Q, the cutting or milling-wheel mounted on said shaft and provided with a peripheral V-shaped cutting-edge arranged to enter between the ends of the cotter-shanks, substantially as and for the purpose specified and shown.

15. In combination with the cotter-carrier, the combined oscillatory and rotary shaft Q, cutting or milling wheel E′, secured to said shaft, the lever P, rod $r$, connecting the shaft Q with one end of said lever, and the cam $q$, engaging the opposite end of the lever, substantially as and for the purpose set forth.

16. In combination with the head H and cotter-carriers I I, mounted thereon, combined oscillatory and rotary shaft Q, milling-wheel E′ on said shaft, lever P, and cam $q$, actuating said lever, the connecting-rod $r$, made adjustable in length to conform to different sizes of milling-wheels, substantially as set forth.

17. The combination of the horizontal rotary shaft O, provided with the miter-gear T, the pedestal P′, mounted on said shaft, the vertical shaft Q, journaled on the said pedestal and provided with the miter-gear T′, meshing in the gear T, the milling-wheel E′, attached to the shaft Q, the box M, riding on horizontal guides, and the reciprocating rod $r$, connected with said box, substantially as specified and shown.

18. In combination, with the driving-shaft Z, intermittent rotary head H, and cotter-carriers I I, mounted on said head, the pivoted levers $v$ $v$ and $v'$ $v'$, respectively, at diametrically-opposite sides of the head H, the jaws $m$ $m$ and $m'$ $m'$, attached to the upper ends of said levers, toggles $u$ $u'$, connected to the opposite ends of the levers, the yoke W, having the guide-slot $w''$ astride the shaft Z and connected with the toggles $u$ $u'$, the roller $w'$, pivoted on the yoke, and the cam Z′ on the driving-shaft, all combined to operate substantially as specified and shown.

19. In combination with the intermittent rotary head H and cotter-carriers I I, mounted thereon, an intermittent reciprocating retractor adapted to engage the cotter and withdraw it from its carrier during the intervals of rests of the head H, substantially as set forth.

20. In combination with the intermittent rotary head H and cotter-carriers I I, mounted thereon, an intermittent reciprocating slide arranged parallel with the cotter-carriers and an arm hinged on said slide, and having its free end lying toward the head H, and formed with a hook, substantially as and for the purpose set forth.

21. In combination with the intermittent rotary head H and cotter-carriers I I, mounted thereon, the slide B, hooked arm C, hinged on the slide, the lever $a$, pivoted at one end and connected at the opposite end with the slide B, the push-bar $f$, cam U, and retracting-spring S′, substantially as described and shown.

22. In combination with the intermittent rotary head H and cotter-carriers I I, mounted thereon, the slide B, hooked arm C, hinged on said slide, the lever $a$, pivoted at one end and connected at the opposite end with the slide, the push-bar $f$, yieldingly connected with the lever $a$, the springs S S′, and the cam U, all substantially as described and shown.

23. In combination with the intermittent rotary head H and cotter-carriers mounted thereon, the slide B, hooked arm C on said slide, rock-shaft J, lever $a$, and the arm $i$, connecting said lever with the rock-shaft adjustably in relation to the length of said arm between its points of connection, whereby the movement of the hooked arm C can be regulated according to the length of the cotters to be operated on, substantially as set forth.

24. In combination with the pivoted head H, the circular rack $h$, ratchet-wheel $g$, and crank $f'$, rigidly attached to the axis of the head H, the cams $d$ and $d'$, attached to a rotary shaft, the bell-crank lever $l$, having one arm adapted to engage the rack $h$, and the other arm in contact with the cam $d'$, the pawl $g'$, connected with the crank $f'$ and adapted to engage the ratchet-wheel $g$, the pitman $e$, connected at one end with the crank $f'$ and having its opposite end slotted and astride the aforesaid rotary shaft, and the roller $d''$, pivoted on the pitman and in contact with the cam $d$, all combined to operate substantially in the manner specified and shown.

In testimony whereof we have hereunto signed our names and affixed our seals, in the presence of two attesting witnesses, at Syracuse, in the county of Onondaga, in the State of New York, this 4th day of March, 1885.

WILLARD A. SMITH. [L. S.]
    IRVING A. WESTON. [L. S.]

Witnesses:
    C. H. DUELL,
    F. H. GIBBS.